No. 775,588. PATENTED NOV. 22, 1904.
H. WARDEN.
METHOD OF MANUFACTURING BUILDING BLOCKS FROM MATERIAL INCLUDING HYDRAULIC CEMENT.
APPLICATION FILED AUG. 2, 1902.
NO MODEL.

Witnesses:

Inventor:

No. 775,588. Patented November 22, 1904.

UNITED STATES PATENT OFFICE.

HENRY WARDEN, OF FREDERICKSBURG, VIRGINIA.

METHOD OF MANUFACTURING BUILDING-BLOCKS FROM MATERIAL INCLUDING HYDRAULIC CEMENT.

SPECIFICATION forming part of Letters Patent No. 775,588, dated November 22, 1904.

Application filed August 2, 1902. Serial No. 118,054. (No model.)

*To all whom it may concern:*

Be it known that I, HENRY WARDEN, a citizen of the United States of America, residing in Fredericksburg, in the county of Spottsylvania, in the State of Virginia, have invented a certain new and Improved Method of Manufacturing Building-Blocks from Material Including Hydraulic Cement, of which the following is a true and exact description, reference being had to the accompanying drawings, which form a part thereof.

My invention relates to the manufacture of building-blocks known as "bricks" or "artificial stone" from material including as an ingredient hydraulic cement. In the manufacture of such building-blocks the composition, such as a mixture of sand and cement, are molded into the desired form and then kept wet for a number of days, the usual practices being either to immerse them in water at intervals or to pour water over them, also at intervals, both of which methods of wetting the blocks are open to numerous objections, both because of the irregularity in the supply of water and also because of the liability to wash some portions of the substance out of the block before the materials have become set.

The object of my invention is to furnish a constant and even supply of water to the block, which will be regulated by the absorption of the water into the block and which will be supplied in such a way as not to effect any washing action with incidental loss of valuable material and impairment of the surface of the block, and this I accomplish by placing in contact with the molded blocks a substance having the capacity of taking up water by capillary attraction and immersing a portion of said substance in a body of water having such a position with respect to the block that the flow of water by capillary attraction will be sufficient, and I then supply the blocks with water necessary for the setting of the cement in a manner which insures a supply proportioned to the absorption taking place into the block and excludes the possibility of a too great or injurious supply, and I may note that for the best results—that is to say, the most even supply of water—the level of water in the reservoir should be maintained at a constant height.

Figure 1:
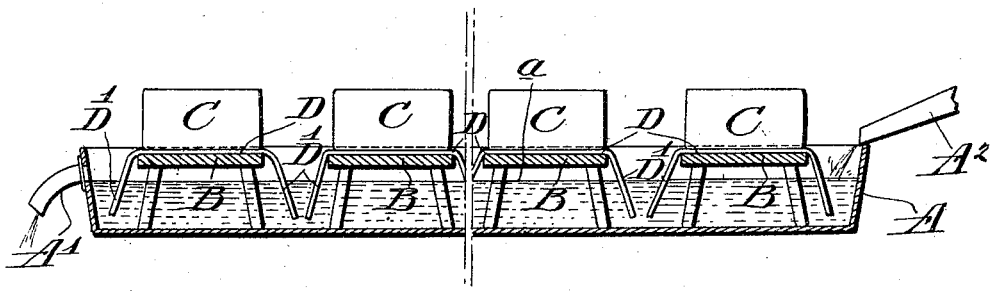
Figure 2:
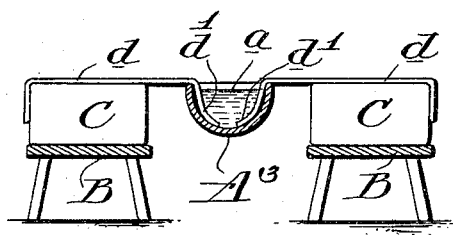

Reference being now had to the drawings, which illustrate the application of my method in two different arrangements, Figure 1 illustrates the block as being placed upon the substance having capillary attraction, while Fig. 2 illustrates an arrangement in which the capillary substance is placed upon the block.

A, Fig. 1, is a water-reservoir, $A^2$ indicating a supply-pipe through which water is kept constantly flowing into the reservoir, and A' an outlet-pipe which regulates the height to which the water can rise in the reservoir. In practice the supply of water should be somewhat in excess of the absorption taking place into the blocks, so that the water-level (indicated at $a$) will remain constant.

B indicates a table extending over and close to the surface of the water in the reservoir A.

D indicates a substance having capillary attraction, which is placed upon the table B and has ends, such as D' D', extending down into the water in the reservoir.

C indicates the block made up of material including hydraulic cement.

In Fig. 2 the water-reservoir (indicated at $A^3$) is placed to one side of and slightly above the table B, and this substance having capillary attraction, which may be a piece of fabric having this capacity, is thrown over the top of the block C and has its end $d'$ extending into the reservoir $A^3$. In either case it will be obvious that the water from the reservoir will be carried by capillary attraction in the substance D or $d$ into contact with the block C, and the block being absorbent will take up the water, thereby maintaining a constant flow of water from the reservoir through the substance D or $d$ into the block, the flow being exactly proportioned to the rapidity with which the absorption into the block is occurring.

Having now described my invention, what I claim as new, and desire to secure by Letters Patent, is—

1. In the manufacture of building-blocks from material including hydraulic cement, the method of gradually supplying water thereto to hydrate the cement without washing out soluble constituents of the blocks, which consists in placing the blocks in intimate contact with a substance having the capacity of taking up water by capillary attraction, immersing a portion of said substance in water, and so arranging the portion of said substance connecting its immersed portion and that in contact with the block, that the flow of water therethrough will be induced by capillarity alone without assistance from the weight of the water contained in said portion, whereby sufficient water is furnished to the block as it absorbs water from the capillary substance and an excessive flow of water avoided.

2. In the manufacture of building-blocks from material including hydraulic cement, the method of gradually supplying water thereto to hydrate the cement without washing out soluble constituents of the blocks, which consists in placing the blocks in intimate contact with a substance having the capacity of taking up water by capillary attraction, immersing a portion of said substance in water maintained at a constant level, and so arranging the portion of said substance connecting its immersed portion and that in contact with the block, that the flow of water therethrough will be induced by capillarity alone without assistance from the weight of the water contained in said portion whereby sufficient water is furnished to the block as it absorbs water from the capillary substance and an excessive flow of water avoided.

3. In the manufacture of building-blocks from material including hydraulic cement, the method of gradually supplying water thereto to hydrate the cement without washing out soluble constituents of the blocks, which consists in placing the blocks in intimate contact with a substance having the capacity of taking up water by capillary attraction, and immersing a portion of said substance in water, the surface of which is maintained at a lower level than the surface of the block with which the capillary substance is in contact whereby sufficient water is furnished to the block as it absorbs water from the capillary substance, and an excessive flow of water avoided.

HENRY WARDEN.

Witnesses:
S. SYDNEY BRADFORD,
A. RANDOLPH HOWARD.